United States Patent [19]
Chen

[11] Patent Number: 5,730,413
[45] Date of Patent: Mar. 24, 1998

[54] HANGER ASSEMBLY

[76] Inventor: Antony Chen, No. 863, Chien Hsing Rd., North Dist., Taichung, Taiwan

[21] Appl. No.: 804,116

[22] Filed: Feb. 20, 1997

[51] Int. Cl.⁶ .................................................. A47G 1/16
[52] U.S. Cl. .......................................... 248/489; 248/303
[58] Field of Search ................................ 248/489, 493, 248/494, 475.1, 304, 339, 488, 490, 303

[56] References Cited

U.S. PATENT DOCUMENTS

| 4,094,490 | 6/1978 | Einhorn | 248/489 |
| 4,124,189 | 11/1978 | Einhorn | 248/489 |

FOREIGN PATENT DOCUMENTS

| 823028 | 10/1937 | France | 248/489 |

*Primary Examiner*—Ramon O. Ramirez
*Attorney, Agent, or Firm*—William E. Pelton

[57] ABSTRACT

A hanger assembly includes a mounting member having an engaging disk with a first outer thread formed on an outer periphery thereof. A supporting lug with a dimension smaller than that of the engaging disk protrudes from the engaging disk and has two cavities each laterally defined therein. A second outer thread is formed on an underside of the supporting lug and in alignment with the first outer thread. A suspending member is mounted on the underside of the suspending lug and includes two snapping portions each received in one of the two cavities. A cap is mounted around the mounting member and has an abutting edge abutting on the suspending member. An inner thread is formed on an inner periphery of the cap and is threadedly engaged with the first outer thread and the second outer thread.

4 Claims, 5 Drawing Sheets

HANGER ASSEMBLY

FIELD OF THE INVENTION

The present invention relates to a hanger assembly, and more particularly to a hanger assembly for attaching an article to a vertical wall.

BACKGROUND OF THE INVENTION

A conventional hanger is shown in FIG. 7, and there will be a complete illustration in the detailed description of the preferred embodiments, concerning the conventional hanger.

The present invention has arisen to mitigate and/or obviate the disadvantage of the conventional hanger.

SUMMARY OF THE INVENTION

The primary objective of the present invention is to provide a hanger assembly disposed in a hidden manner so as enhance an aesthetic quality thereof.

In accordance with one aspect of the present invention, there is provided a hanger assembly comprising a mounting member including an engaging disk having a first outer thread formed on an outer periphery thereof.

A supporting lug protrudes from the engaging disk and has a dimension smaller than that of the engaging disk. A second outer thread is formed on an underside of the supporting lug and in alignment with the first outer thread. Two cavities are each laterally defined in the supporting lug.

A suspending member is mounted on the underside of the suspending lug and includes two snapping portions each received in a corresponding one of the two cavities.

A cap is mounted around the mounting member and has an abutting edge abutting on the suspending member. An inner thread is formed on an inner periphery of the cap and is threaded by engaged with the first outer thread and the second outer thread.

Further features of the present invention will become apparent from a careful reading of the detailed description with appropriate reference to the accompanying drawings.

DETAILED DESCRIPTION OF THE PREFERRED EMBODIMENTS

Figure 7:
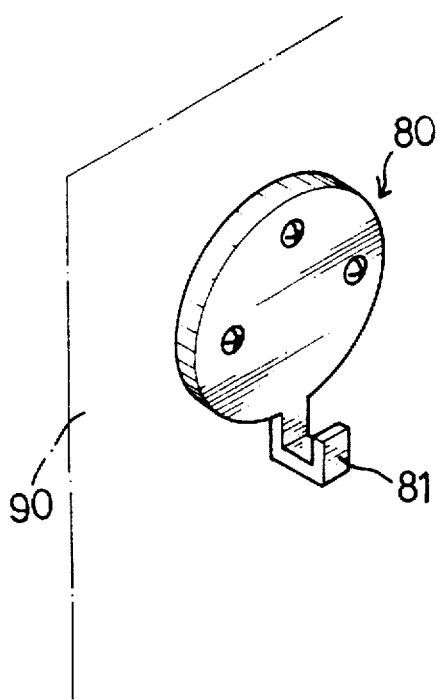
FIG. 7 is a perspective view of a conventional hanger in accordance with the prior art.

For a better understanding of features and benefits of the present invention, reference is made to FIG. 7, illustrating a conventional hanger in accordance with the prior art.

The conventional hanger 80 is fixed to a vertical wall 90 and includes a hook portion 81 for suspending such as a clothing, a painting and the like. However, the hanger 80 is exposed to surroundings, so easily reducing the aesthetic quality of the clothing or the painting.

Referring now to FIGS. 1-4, a hanger assembly in accordance with the present invention is provided for attaching an article (not shown) such as a painting, a clothing and the like to a vertical wall 50.

The hanger assembly comprises a mounting member 10 including an engaging disk 11 having a first outer thread 112 formed on an outer periphery thereof. A supporting lug 13 protrudes from the engaging disk 11 and is fixedly attached to the vertical wall 50.

Preferably, the supporting lug 13 has a dimension smaller than that of the engaging disk 11 and includes two arcuate sides 131 and a flat surface 133 formed on an upper portion of each of the two arcuate sides 131. A second outer thread 132 is formed on an underside of the supporting lug 13 and in alignment with the first outer thread 112. Two cavities 135 are each laterally defined in the supporting lug 13.

A suspending member 30 is mounted on the underside of the suspending lug 13 and includes two snapping portions 32 each received in a corresponding one of the two cavities 135, and includes a hook portion 34 for suspending such as a clothing, a painting and the like.

A cap 20 is mounted around the mounting member 10 and has an abutting edge 202 abutting on the suspending member 30. An inner thread 21 is formed on an inner periphery of the cap 20 and is threadedly engaged with the first outer thread 112 and the second outer thread 132.

By such an arrangement, the cap 20 can fully encompass the mounting member 10, thereby entirely hiding the mounting member 10 in the cap 20, and thereby preventing the mounting member 10 from being exposed to surroundings so as to enhance the aesthetic quality of the painting or clothing.

In addition, the abutting edge 202 of the cap 20 is urged on the suspending member 30 so as to secure the suspending member 30 on the vertical wall 50, thereby preventing the suspending member 30 from swaying.

Figure 1:
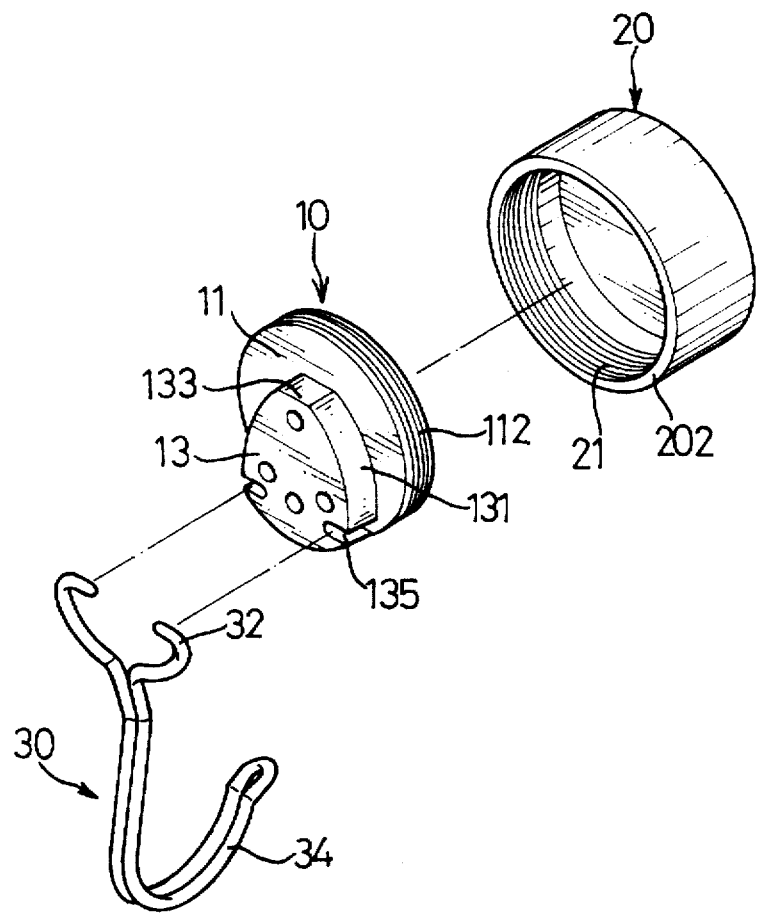
FIG. 1 is an exploded view of a hanger assembly in accordance with the present invention.
Figure 2:
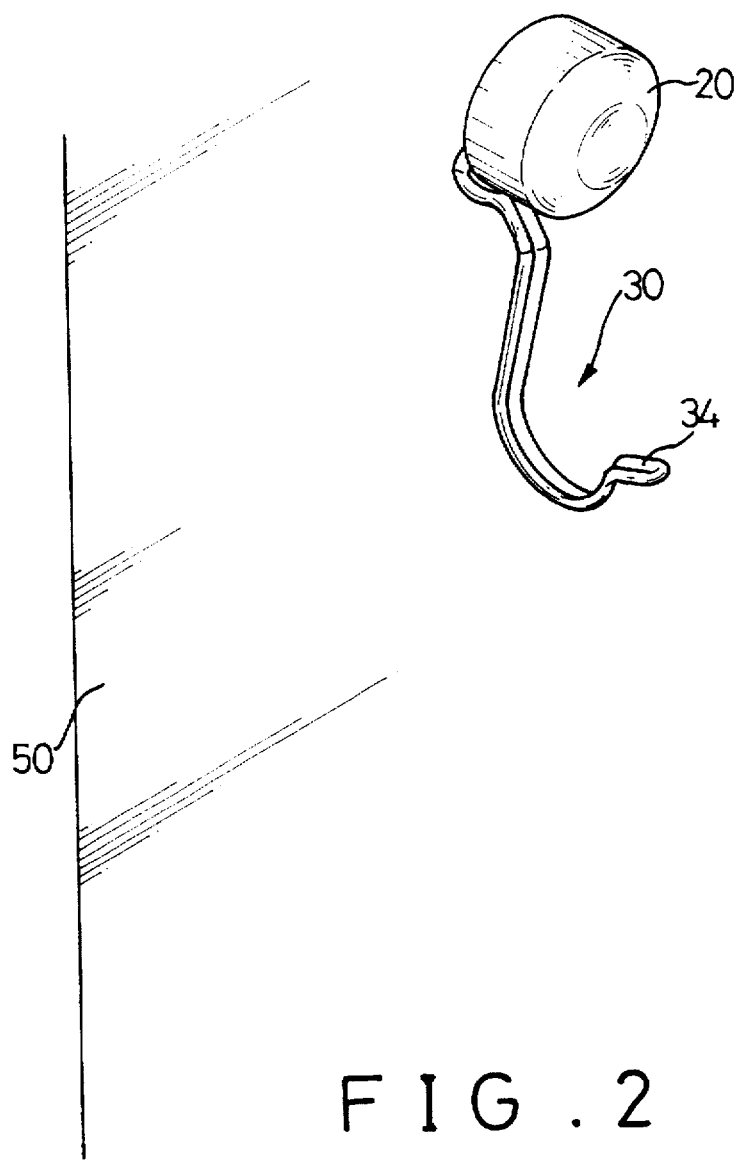
FIG. 2 is an assembly view of FIG. 1.
Figure 4:
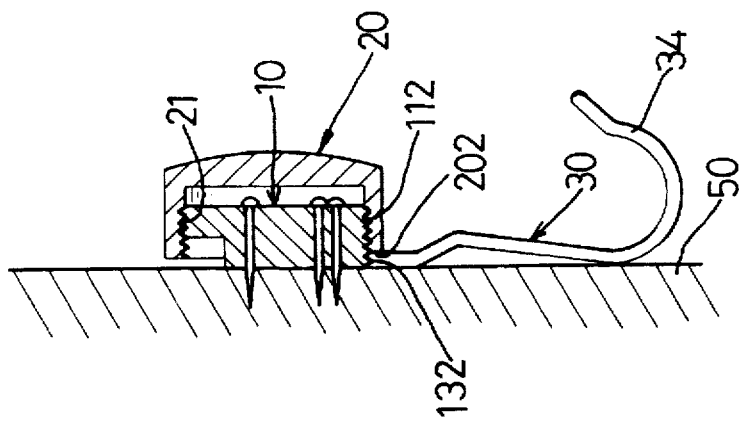
FIG. 4 is an operational view of FIG. 3.
Figure 3:
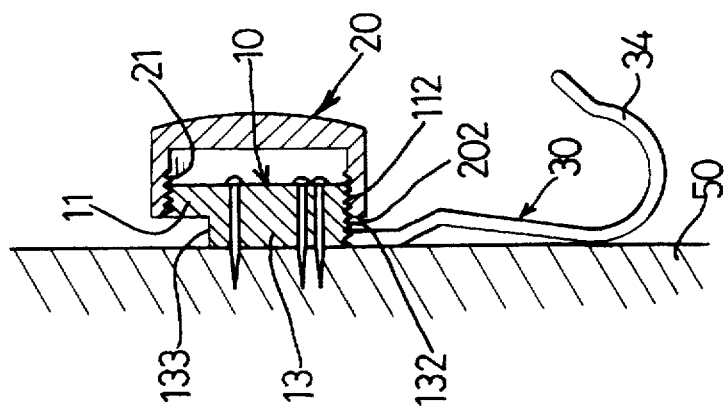
FIG. 3 is a side cross-sectional view of FIG. 2.
Figure 6:
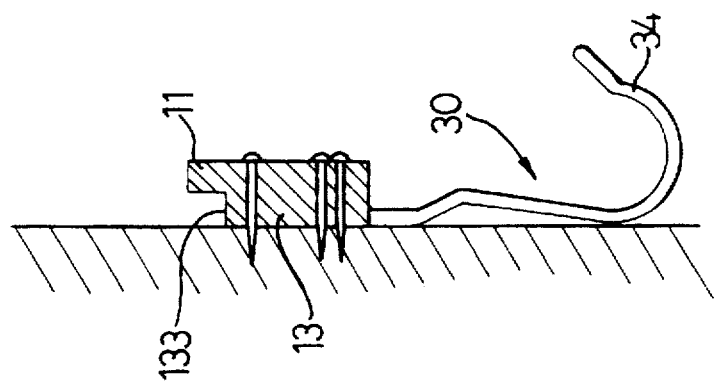
FIG. 6 is a side cross-sectional view of FIG. 5.
Figure 5:
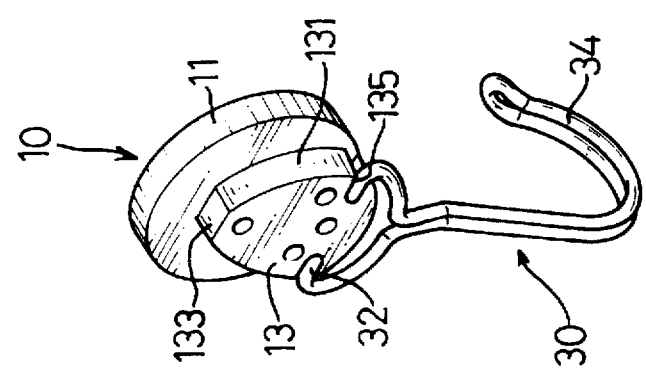
FIG. 5 is a perspective view of a hanger assembly in accordance with another embodiment of the present invention.

Referring now to FIGS. 5 and 6, in accordance with a second embodiment of the present invention, wherein the cap 20 and the first and second outer threads 112 and 132 are undefined.

It should be clear to those skilled in the art that further embodiments of the present invention may be made without departing from the spirit and scope of the present invention.

What is claimed is:

1. A hanger assembly comprising:

a mounting member (10) including an engaging disk (11) having a first outer thread (112) formed on an outer periphery thereof, a supporting lug (13) protruding from said engaging disk (11) and having a dimension smaller than that of said engaging disk (11), a second outer thread (132) formed on an underside of said supporting lug (13) and in alignment with said first outer thread (112), and two cavities (135) each laterally defined in said supporting lug (13);

a suspending member (30) mounted on the underside of said suspending lug (13) and including two snapping portions (32) each received in a corresponding one of said two cavities (135); and a cap (20) mounted around said mounting member (10) and having an abutting edge (202) abutting on said suspending member (30), an inner thread (21) formed on an inner periphery of said cap (20) and threadedly engaged with said first outer thread (112) and said second outer thread (132).

2. The hanger assembly in accordance with claim 1, wherein said supporting lug (13) includes two arcuate sides (131), and a flat surface (133) formed on an upper portion of each of said two arcuate sides (131).

3. A hanger assembly comprising:

an engaging disk (11);

a supporting lug (13) integrally formed on and protruding from said engaging disk (11) and having a dimension smaller than that of said engaging disk (11), and two cavities (135) each laterally defined in said supporting lug (13); and a suspending member (30) mounted on an underside of said suspending lug (13) and including two snapping portions (32) each received in a corresponding one of said two cavities (135).

4. The hanger assembly in accordance with claim 3, wherein said supporting lug (13) includes two arcuate sides (131), and a flat surface (133) formed on an upper portion of each of said two arcuate sides (131).

* * * * *